United States Patent [19]

Hatrock

[11] Patent Number: 4,983,086

[45] Date of Patent: Jan. 8, 1991

[54] FASTENER FOR BATTERY CONNECTOR

[76] Inventor: David L. Hatrock, 1203 E. Linden, Coeur d'Alene, Id. 83814

[21] Appl. No.: 276,310

[22] Filed: Nov. 25, 1988

Related U.S. Application Data

[63] Continuation-in-part of Ser. No. 6,383, Jan. 20, 1987, abandoned.

[51] Int. Cl.[5] .............................................. F16B 37/00

[52] U.S. Cl. .................................... 411/366; 411/401; 411/409; 411/432; 411/908; 439/757

[58] Field of Search ............... 269/271, 273, 274, 277; 411/368, 369, 908, 432, 533, 371, 366, 427, 166, 176; 439/757, 758

[56] References Cited

U.S. PATENT DOCUMENTS

| | | | |
|---|---|---|---|
| 1,311,473 | 7/1919 | Vossler | 411/546 |
| 1,596,891 | 8/1926 | Rensch | 439/757 |
| 2,049,649 | 8/1936 | Heitman | 439/758 |
| 2,154,507 | 4/1939 | Hunefeld et al. | 439/758 |
| 2,311,042 | 2/1943 | Ferguson | 269/249 |
| 2,347,168 | 4/1944 | Beckman | 439/757 |
| 2,890,845 | 6/1959 | Kiekhaefer | 411/908 X |
| 2,894,244 | 7/1959 | Ringhof | 439/757 |
| 3,505,636 | 4/1970 | McDowell | 439/758 |
| 3,838,386 | 9/1974 | Chartain et al. | 439/757 |
| 3,973,820 | 8/1976 | Benson | 439/758 |

*Primary Examiner*—Gary L. Smith
*Assistant Examiner*—Jerry Redman
*Attorney, Agent, or Firm*—Keith S. Bergman

[57] ABSTRACT

A manually manipulatable nut and bolt fastener for a battery terminal clamp provides an nut configured to engage one of the fingers of a typical bifurcated battery terminal clamp and a bolt engaging the other finger to move the fingers relatively responsive to nut-bolt motion. The nut-bolt combination is formed of flexibly resilient polymeric material to deform to accommodate axial and lateral repositioning and alignment of the bolt as the battery clamp fingers move relatively to each other. The fastener eliminates normal corrosion associated with metallic fasteners for battery terminal clamps.

1 Claim, 1 Drawing Sheet

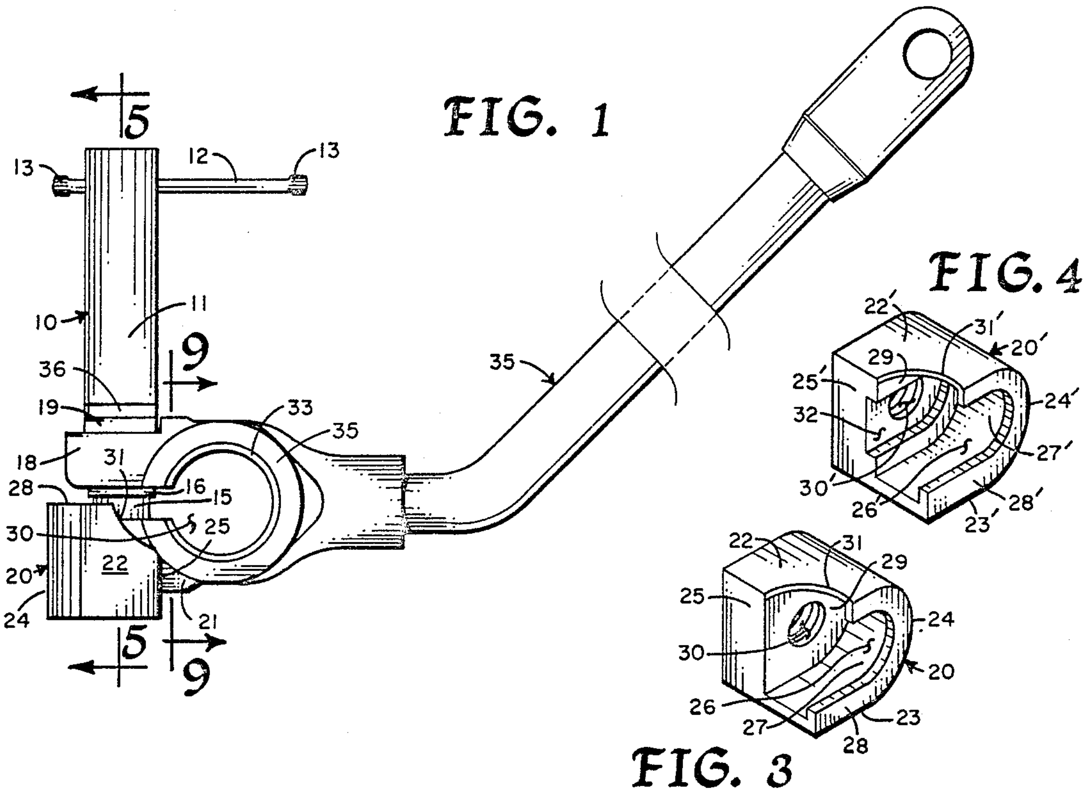
FIG. 1
FIG. 4
FIG. 3
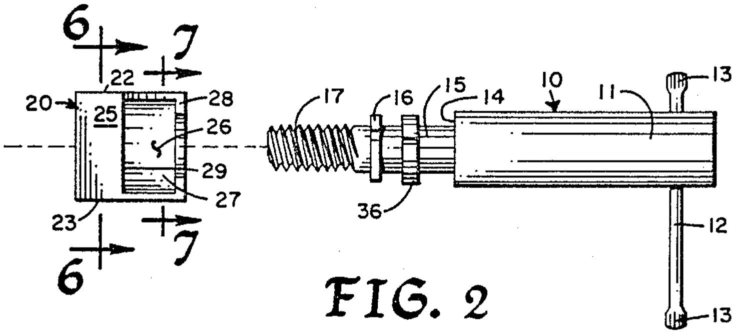
FIG. 2
FIG. 8
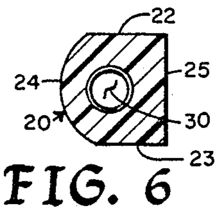
FIG. 6
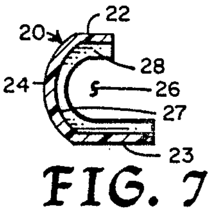
FIG. 7
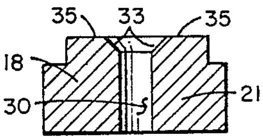
FIG. 9
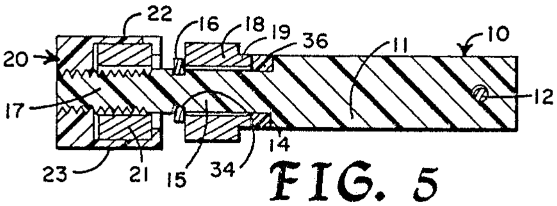
FIG. 5

FASTENER FOR BATTERY CONNECTOR

BACKGROUND OF INVENTION

RELATED APPLICATIONS

This is a continuation-in-part of a copending application, Ser. No. 07/006,383, filed on 1/20/87.

FIELD OF INVENTION

My invention relates generally to bolt fasteners for battery terminal clamps and more particularly to such devices formed completely of resiliently deformable polymeric material to eliminate corrosion.

DESCRIPTION OF PRIOR ART

The use of top terminal, acid type batteries in various vehicle environs has plagued users with problems of significant corrosion at and about the terminals that results in diminished battery output to a vehicle and in reduced effectiveness in recharging a battery in the normal course of operation of a vehicle. Various solutions have been devised to eliminate this problem but none have proven completely satisfactory. One approach has been to utilize chemical treatment to inhibit corrosion, but this over a period of time loses its effectiveness from dirt and grease contamination, ordinary wear and abrasion, and normal consumption of active chemicals involved.

Various mechanical connectors to secure leads to battery terminals have become known, but they also have generally proven to be deficient in preventing corrosion in their corrosive environment. Most battery terminal clamps have to various degrees used metal to form at least part of their connecting elements. Some of these connectors have used metal with a laminated coating of plastic or other material to attempt to form a protective covering surface. Unfortunately, however, the use of a metal element anywhere in a battery terminal connector, and especially on surfaces between relatively movable parts, will limit the connector's useful life, as coatings are worn off as the part is used in the normal course of its life and a coating may become damaged or permeated with acid with the resultant formation of corrosion in the protected metallic portion.

The conventional terminal fastener typically employs a metallic nut and bolt, both of which easily corrode, and as this occurs the removal of a terminal connector fastened thereby becomes progressively more difficult. This situation is exacerbated and may become hazardous if a conventional metallic wrench be used to remove such a fastener, as the tool, if moved in an arc in a typical motor vehicle environment, may strike other electrically conductive parts of the vehicle to create sparks and cause shocks if the tool shorts any electrical circuits.

Further as traditional "U" shaped terminal connectors have been loosened there commonly is a further need to spread the fingers apart to remove the connector from a terminal. Prior connectors themselves have not provided means to do this and elaborate pullers often have been required to remove the connector from a battery terminal without harming the terminal or the connector. The instant invention solves this problem.

I provide a nut-bolt type fastening assembly for a common "U" shaped battery connector of present day commerce that is formed completely of a non-metallic polymeric material. The bolt is relatively rigid yet has sufficient resilient deformability to enable it to align with its counterpart holes as the fastener is tightened. The nut has a curvilinear periphery to aid a user's manual manipulation and its interior defines a cavity configured to accept one finger of a bifurcated battery connector and positionally maintain the nut relative to it. The bolt is formed with a medial smooth section to fit in a hole defined by the second connector finger and is secured therein by a lock ring to prevent relative axial movement of the bolt in its carrying connector finger. This allows spreading of the battery connector fingers responsive to fastener motion, notwithstanding that the holes in the opposed cooperating fastening fingers move somewhat out of axial alignment.

Additionally the nut has a recess formed on an internal surface so that it may be positioned on either finger of battery connector, as typically such fingers are not identical and one may have a raised boss on one external face to position the threaded male portion of a fastener. This feature is advantageous where clearance is limited and the fastening means may need to be secured in a laterally reversed position for clearance, since the battery clamp itself cannot be vertically reversed on the terminal because of its tapered fastening channel.

There are many positive ground vehicle electric systems in existence and such vehicles are today produced in substantial numbers, especially in Europe. Electrical systems in such vehicles present an inherent hazard in that upon collision or damage to the electrical system, the vehicle may become electrically charged and may spark upon electrical shorting to present a fire hazard because of volatile combustible fluids that a vehicle typically stores. To avoid such problems after an accident, a quick disconnection of the battery is required. The fastener of the present invention provides means for such a quick manual disconnect without tools.

My connector fastener is not limited to use with automotive vehicles but is adaptable to other battery uses such as in marine, recreational, and industrial applications.

My instant invention is distinguished from the prior art not in any one of these features per se, but rather in the synergistic combination of all of its structures that provide the functions necessarily flowing therefrom as hereinafter specified and claimed.

SUMMARY OF THE INVENTION

My battery connector fastener provides a bolt with an elongated cylindrical head portion, a medial smaller shank to fit in a bore defined in a first connector finger, and a threaded forward portion to threadedly engage a companion nut carried on a second connector finger. A snap ring is releasably carried in a groove defined between the threaded and shank portions to maintain the bolt in its supporting bore. A spacer element is optionally positionable on the smaller shank portion to accommodate dimensional variations in battery connector fingers. The nut defines recesses to accept the boss portion commonly provided by one arm of some bifurcated battery connectors. The entire assemblage is of non-metallic polymeric construction to provide necessary rigidity but allow resilient deformability to enable the bolt to deform to maintain axial alignment in both moving battery connector fingers.

Once attached to a connector, my fastener acts both to pull the connector fingers together when the fastener is tightened and force them apart when the fastener is unscrewed to disengage the battery connector from a supporting battery terminal.

In creating such a fastener, it is:

A principal object of my invention to provide a fastening assembly for a bifurcated type battery terminal connector, that is made entirely of non-metallic polymeric material to eliminate corrosion in battery environments.

A further object of my invention to provide such a fastening assembly that not only is easily securable to fasten a battery connector, but that also allows the fingers of a bifurcated connector to be spread for removal from a battery terminal.

A further object of my invention to provide such a fastening assembly that has a resiliently deformable bolt to maintain axial alignment in bores in both connector fingers while moving those fingers toward or away from each other.

A further object of my invention to provide a fastening assembly that has a handle to aid manual manipulation and eliminate the need for separate tools to allow the fastening and removal of a connector on a battery terminal.

A further object of my invention to provide such a fastening assembly that enhances the safety of battery use in a motor vehicle having a positive ground by enabling the prompt removal of a battery connector from a terminal when necessary.

A still further object of my invention is to provide such a fastening assembly that is selectively securable to either finger of a typical bifurcated battery clamp.

A still further object of my invention to provide a removable spacer element positionable on the shank portion of a bolt to adapt the fastener to a greater number of battery connectors of differing configurations.

A still further object of my invention to provide such a fastening assembly that is of new and novel design, of rugged and durable nature, of simple and economic manufacture and otherwise well suited to the uses and purposes for which it is intended.

Other and further objects of my invention will appear from the following specification and accompanying drawings which form a part hereof. In carrying out the objects of my invention, however, it is to be understood that its essential features are susceptible of change in design and structural arrangement with only one preferred and practical embodiment being illustrated in the accompanying drawings as is required.

BRIEF DESCRIPTION OF DRAWINGS

In the accompanying drawings which form a part hereof and wherein like numbers of references refer to similar parts throughout:

FIG. 1 is an orthogonal top view of my fastening assembly secured to a typical battery connector to show its various parts, their configuration, relationship and operation.

FIG. 2 is an expanded orthogonal side view of the fastening assembly of FIG. 1.

FIG. 3 is an isometric view of the nut of my fastener showing its internal structural detail.

FIG. 4 is a similar view of a species of the nut of FIG. 3 for use with a connector having a boss defined on the finger it is to fasten on.

FIG. 5 is a vertical cross-sectional view of the fastening assembly of FIG. 1, taken on the line 5—5 on that Figure in the direction indicated by the arrows.

FIG. 6 is a vertical cross-sectional view through the nut of FIG. 2, taken on the line 6—6 on that Figure in the direction indicated by the arrows.

FIG. 7 is a vertical cross-sectional view through the nut of FIG. 2, taken on the line 7—7 on that Figure in a direction indicated by the arrows thereon.

FIG. 8 is an orthographic view of a split ring carried by the bolt member of my fastener.

FIG. 9 is an orthographic cross-sectional view through the fastening fingers of the connector of FIG. 1, taken on the line 9—9 thereon in the direction indicated by the arrows.

DESCRIPTION OF PREFERRED EMBODIMENT

My invention generally comprises bolt 10 threadedly engaging nut 20 to form a quick connect and disconnect fastening assembly for bifurcated battery connector 35.

With attention to FIG. 2, bolt element 10 is seen to provide elongate, diametrically larger, cylindrical head 11 defining a diametrically orientated bore therethrough, inwardly adjacent the rearward end, to slidably accept actuating rod 12 having expanded end portions 13 to maintain operative position in the head. It is to be noted that actuating rod 12 may, as the only element of the fastening assembly, be formed of metal for economic purposes as it is electrically remote from the battery connector and its corrosion would not affect the function of that assembly.

Enlarged cylindrical head 11 terminates in an engaging shoulder 14 which forms a transition to diametrically smaller cylindrical shank portion 15. The shank portion defines a circumferential groove 34 to accept split snap ring 16. The shank portion terminates in threaded end element 17 immediately forwardly of snap ring groove 34. The surface area between the snap ring and shoulder 14 is formed as a smooth bearing surface that in use is positioned in a bore defined in finger 18 of bifurcated battery connector 35.

As best seen in FIG. 1, engaging shoulder 14 is so formed and configured as to abut raised boss portion 19 of first finger element 18. The length, measured from shoulder 14, of the smooth reduced shank portion is so determined that split ring groove 34 is immediately inwardly adjacent the inner surface of connector finger 18 so that split lock ring 16 may fit in groove 34 to capture the finger. This prevents fastening bolt 10 from axial movement relative to its carrying finger once positioned. The length of threaded end portion 17 which forms the forward end of bolt member 10 is sufficient to span the distance from first finger 18 to companion finger 21 and extend through the bore defined in that second companion finger and through the threaded portion of nut 20 on the outer side thereof.

Nut member 20 has planar sides 22, 23 communicating with curved rear portion 24 to present a smooth side surface upon which a user may comfortably manually manipulate element 20 into engagement with a finger of a battery connector. The nut provides planar outer surface 25 adjacent connector finger cavity 26. This cavity is bounded by curved rear wall 27, floor 29 and a "U" shaped flange 28, all configured to allow cavity 26 to matingly accept the end part of finger member 21 of battery connector 35 in complementary engagement. Floor element 29 defines medial threaded bore 30 to operatively engage threaded end 17 of the elongated bolt member 10. A relief cut 31 is defined across side wall portion 22 to allow an appropriate fit of the nut member on a connector finger having a boss that would extend therein.

Spacer element 36 illustrated in use in FIG. 1 is optionally utilized with my fastener to accommodate dimensional variations among battery clamps with differing finger widths. The spacer element 36 reduces the effective axial length of smaller shank portion 15 when positioned thereon.

The nut and bolt members of the fastening assembly are formed of an electrically insulating and relatively acid resistant non-metallic material, such as nylon, a nylon matrix with additives or other polymeric material, that is of adequate rigidity to enable the fastener to clamp a battery connector about a terminal and yet of sufficient resilience to enable the device to deform axially to assure a positive non-binding threaded connection between the bolt-nut elements 10, 20.

The construction of battery connectors should be noted, as they are typically formed of a lead alloy material that is electrically conductive yet soft and deformable about a battery terminal to provide adequate electrical contact. Such connectors are formed with a tapered bore, as is indicated at 33 in FIG. 1, to mate with a conformably tapered battery terminal to form a tight secure fit. This type of fit has a disadvantage in that a battery connector is not reversible upon a terminal and will only properly engage the terminal through unique orientation of the connector.

Because of size and space limitations characteristic of modern vehicular construction, it may become necessary to reverse the fastening assembly of the present invention side for side in a battery connector. Without some modification of my nut member this is not practically possible, since raised boss 19 would prevent the nut member from being positioned upon finger 18 as it is upon finger 21. A typical battery connector forms one of its fingers 21 with a planar side construction while the other finger 18 has a raised boss 19 which normally engages a fastener, in this case shoulder 14 defined by cylindrical portion 11. A further embodiment of the nut fastening element which provides recess 32 shaped to accept a projecting boss member 19 is illustrated in FIG. 4. With this species configuration, element 20 may be positioned upon either battery connector finger 18 or finger 21 depending upon need. As seen in FIG. 4, there would still remain ample floor 29 to enable the nut to engage and have sufficient contact surface to impose locking force upon a battery connector in use. Bolt member 10 normally may be positioned on either finger without modification.

Having thusly described the structure of my invention, its use may be understood.

Bolt 10 is positioned within the bore defined in finger 18 of battery connector 35. Snap ring 16 is positioned within its pre-formed groove 34 defined in the bolt member and nut 20 is positioned with its mating cavity enclosing the end part of opposing finger 21. The bolt member is then threadedly engaged in the nut member and the connector is then positioned on the terminal to be serviced. The thusly assembled fastening members 10, 20 may then either secure or disengage the connector about a battery terminal by moving fingers 18 and 21 of the connector toward or away from each other responsive to bi-directional rotary motion of the bolt member. When securing a connector to a terminal by threadedly moving my fastening assembly together, floor 29 of the nut member imposes an inward force on finger 21 while shoulder 14 of the bolt member imposes an inwardly directed force on raised boss 19 of finger 18, thus clamping the battery connector about its supporting terminal.

When it is desired to quickly disengage a battery connector embodying my invention, a user merely rotates bolt member 10 in the opposite direction to that hereinbefore described. Lock ring 16 will then prevent bolt member 10 from axial movement relative to finger 18 and "U" shaped flange 28 will impose an outward or spreading force on opposite finger 21 of the connector to thusly spread the connector's fingers apart to cause disengagement of the connector from a supporting terminal. In accomplishing this motion it is to be noted that the axis of the bores in the opposed connector fingers 18, 21 will move out of coincidence. To allow this motion without physically damaging those bores or the bolt portions in them, my bolt must be resiliently deformable. If the bolt does not deform especially in its portion between connector fingers, it will deform one or the other of the bores in the connector fingers carrying it and ultimately cause wear and deformation that enhances the potential of corrosion and may even cause galling.

An efficient means is thus provided for the rapid assembly and disassembly of a battery connector to or from a terminal. Further, the complete non-metallic construction of the various elements in contact with the battery connector virtually eliminates corrosion in the fastening structure and lessens it in the connector structure. This becomes especially significant in the use of modern so-called maintenance-free batteries where corrosion may exist unnoticed between lengthy scheduled maintenance periods.

Relief cut 31 in member 20 is optional in the construction of my device and is so configured to allow appropriate fit of the member upon certain connectors having a boss 35 that fits within the relief cut. Optionally, this relief cut may be desirable on both sides of element 20 when the embodiment of FIG. 4 is utilized.

It should be particularly noted that the function of my connector may not be accomplished with rigid metallic connectors heretofore known, as it is necessary that my bolt be resiliently deformable to maintain substantial axial alignment of its portions carried within the bores defined in the connector fingers as those fingers move toward and away from each other.

The foregoing description of my invention is necessarily of a detailed nature so that a specific embodiment of it may be set forth as required, but it is to be understood that various modifications of detail, re-arrangement and multiplication of parts may be resorted to without departing from its spirit, essence or scope.

Having thusly described my invention, what I desire to protect by Letters Patent, and What I claim is:

1. A fastener for a "U" shaped bifurcated battery connector, having paired opposed fastening fingers each defining aligned bore holes to accept an elongate fastener therebetween, to connect that battery connector upon a battery terminal, comprising in combination;

an elongate bolt fastening member formed of semi-rigid, resilient non-metallic material that deforms to allow battery connector fingers carrying the bolt fastening member in the bores defined therein to move toward and away from each other without deforming the bores in said fingers, said bolt fastening member having an enlarged head portion, with means to aid rotation thereof, structurally communicating with an axially aligned diametrically smaller medial medial shank portion of predetermined length, configured to fit through a bore defined in a first finger of the bifurcated battery connector, with a locking device releasably securable on the shank at a spaced distance from the head to prevent axial movement of the fastening member relative to the said first finger when the reduced portion is positioned within the bore of the first finger, and a forward threaded portion at the end opposite the head; and a nut member, formed of semi-rigid resilient non-metallic material, defining a cavity bounded by a flange on one end and by a floor on the other end, said floor defining a threaded bore and said cavity configured to accept the end part of a second finger of a bifurcated battery terminal connector in mating relationship with said threaded bore aligned with a bore defined in the second finger to accept the threaded end portion of the bolt member is threaded engagement therethrough, the nut member formed with relief cuts in at least one corner and in the floor thereof to allow the nut member to fit upon the end part of a fastening finger of a battery connector defining a boss.

* * * * *